United States Patent Office 2,967,131
Patented Jan. 3, 1961

2,967,131

THERAPEUTIC COMPOSITION

Charles H. Elbreder and Edward J. Ross, St. Louis, Mo., assignors to Charles J. Nemanick, St. Louis, Mo.

No Drawing. Filed Feb. 8, 1954, Ser. No. 408,984

3 Claims. (Cl. 167—93)

This invention relates to therapeutic compositions in dosage unit form and more particularly to such compositions useful in the control of dental caries.

This application is a continuation-in-part of our copending application, Serial No. 326,162, filed December 15, 1952, now abandoned.

Briefly, the invention is directed to a composition in dosage unit form comprising a compound which is soluble in water to form between approximately 0.1 and approximately 4.5 mg. of fluoride ions, a major portion of sodium chloride, approximately 0.5% by weight of a dispersant, and between approximately 0.5 and approximately 1.5% by weight of a calcium phosphate.

Among the objects of this invention may be noted the provision of compositions in dosage unit form useful in the control of dental caries; the provision of compositions which permit accurate, measured quantities of fluoride ions to be introduced into water or water-containing beverages without affecting the palatability thereof; the provision of such compositions which prevent the ingestion of a toxic dose of fluoride ions; the provision of such compositions which are readily and rapidly soluble in water without the formation of insoluble suspensions or objectionable turbidities; the provision of such compositions which do not appreciably increase the total undesirable solids content of water upon solution, and the provision of compositions of the type described which have an unlimited shelf life. Other objects and features will be in part apparent and in part pointed out hereinafter.

The invention accordingly comprises the products hereinafter described, the scope of the invention being indicated in the following claims.

It has been recognized within the past few years that water containing fluoride ions, within certain limits of concentration, is effective in controlling and inhibiting dental caries. Since many public water supplies are derived from rivers, lakes and ponds which are practically fluoride-free, the practice of fluoridating such water supplies has been instituted recently. This practice has, however, been largely confined to large cities and metropolitan areas, and the benefits of fluoridation have, for the most part, been denied residents of smaller towns, villages and communities. It has been estimated that between approximately one-third to one-half of the population of this country will not benefit by fluoridation of public water supplies, either because of living in rural areas having no public water supply, or residing in communities where the population is so small that proper control of fluoridation cannot be provided. In addition, in communities supplied with natural fluoride-containing waters, water-treating processes such as lime softening, in the presence of magnesium, alum or sodium aluminate, coagulation, including the use of bentonite clay and activated carbon at low pH values, and filtering all tend to remove fluoride from solution.

In accordance with the present invention it has been found that compositions in dosage unit form comprising a compound which is soluble in water to form between approximately 0.1 and approximately 4.5 mg. of fluoride ions, a major portion of sodium chloride, approximately 0.5% by weight of a dispersant, and between approximately 0.5 and approximately 1.5% by weight of a calcium phosphate, provide an accurate source of fluoride ion in readily available form for addition to potable water or water-containing beverages. Moreover, these compositions do not affect the palatability of water or beverage; are readily soluble in water or beverages without the formation of insoluble suspensions or objectionable turbidities, and do not increase the total undesirable solids contents. By undesirable solids we mean compounds which are water-insoluble, unpalatable or deleterious to health.

It has been established that a toxic level of fluoride ions in the case of children is approximately 250 mg. However, we have found that if a large number of these dosage units or tablets is ingested, nausea and emetic action result, thereby preventing the ingestion of a sufficient number of these tablets to supply a toxic dose. Thus, the tablets of the present invention are safe for use with children as well as adults in the control of dental caries and are not subject to the same dangers associated with the use of compositions containing a toxic material. Whether the compositions are administered in dosage tablet form or are dissolved in water and water-containing beverages to supply exact quantities of fluoride ions, this feature of the invention is important since, even in the latter instance, children may still gain access to the tablets prior to the time they are dissolved in water.

The fluorides which are useful in the compositions of this invention are those which ionize to form dilute aqueous solutions. Examples of such fluorides include potassium fluoride, potassium acid fluoride, sodium fluoride, sodium bifluoride, sodium silicofluoride and calcium fluoride. Other fluorides including combined chemical compounds which yield fluoride ions in dilute aqueous solutions may also be employed. The novel water-treating tablets of the present invention contain a compound which will dissolve in water to form between approximately 0.1 and approximately 4.5 mg. of fluoride ions, preferably about 1.0 mg.

The second component of the compositions of the present invention, namely, a phosphate of calcium, provides a source of the elements calcium and phosphorous to enhance the desirable mineral content of the water or aqueous beverages in which the tablets are to be dissolved. Exemplary of the calcium phosphates which may be used are monocalcium phosphate, dicalcium phosphate, and tricalcium phosphate. These phosphate compounds are water-soluble and tasteless, and between approximately 0.5 to 1.5% by weight, preferably about 0.5% by weight, of such a phosphate compound is included in the compositions of this invention.

The remaining portion of these novel compositions comprises a dispersant and a major portion of sodium chloride. By dispersant we mean a substance which, when exposed to water, will immediately and rapidly swell to increase its bulk by a large percent and cause disintegration and dispersion of associated substances. Any dispersant may be employed, but the use of starch is preferred. Potato and corn starches are exemplary binders. Other useful dispersants are methyl and ethyl cellulose. Approximately 0.5% by weight of the dispersant is included in the compositions of the invention. The sodium chloride serves as a bulking agent, the solubility of which aids in the disintegration of the tablets. Approximately 88 to 98% by weight of sodium chloride is included in the compositions of the invention.

The usefulness of the novel water-treating tablets described above may be further enhanced by the addition of other components. For example, vitamins A and D may be added to supplement the action of the other components in controlling and inhibiting caries dentition, and to aid in the utilization of the calcium and phosphorous for sound teeth and tooth enamel structure. Further, a soluble, palatable calcium salt of an organic acid may be included as an additional source of the elements calcium and phosphorus. For example, approximately 5 to 30 mg., preferably about 5 mg., of calcium gluconate, calcium lactate or calcium benzoate may be included in our compositions.

The following examples illustrate the invention:

*Example 1*

A 1.5-grain tablet of a composition in dosage unit form was prepared by homogeneously intermixing the following components and tableting in a standard tableting machine:

| | Mg. |
|---|---|
| Sodium fluoride | 2.2 |
| Potato starch | 0.45 |
| Tricalcium phosphate | 1.35 |
| Sodium chloride, q.s. to 1.5 grains. | |

*Example 2*

Example 1 was repeated, but the components and proportions were as follows:

| | Mg. |
|---|---|
| Sodium fluoride | 2.2 |
| Calcium gluconate | 5.0 |
| Monocalcium phosphate | 5.0 |
| Potato starch | 1.0 |
| Sodium chloride, q.s. to 3 grains. | |

*Example 3*

Example 1 was repeated, but the components and proportions were as follows:

| Sodium fluoride | mg | 2.2 |
|---|---|---|
| Calcium gluconate | mg | 5.0 |
| Monocalcium phosphate | mg | 5.0 |
| Vitamin A | U.S.P. units | 2500 |
| Vitamin D | do | 400 |
| Potato starch | mg | 0.5 |
| Sodium chloride, q.s. to 1.5 grains. | | |

Although it is preferred that the compositions of the invention be prepared in tablets of 1.5 and 3-grain size, as illustrated in the above examples, tablets weighing between approximately 65 mg. and 335 mg. may also be conveniently prepared and used.

The tablets of the present invention when dissolved in water and water-containing beverages such as milk, tea, coffee and the like, provide a safe and effective means for supplying exact quantities of fluoride ions, calcium and phosphorous to the water or beverages. For example, when a 3-grain tablet having the composition of Example 2 is dissolved in one quart of fluoride-free water, water containing approximately one part per million of fluoride is obtained. Similarly, if a like tablet is dissolved in two quarts of water containing 0.5 part per million of fluoride, water containing approximately one part per million of fluoride is obtained. In addition, water so treated is provided with amounts of vitamins A and D and/or calcium or phosphorus corresponding to the compositions given in the examples.

Thus, an adequate daily intake of fluoride ions for the inhibition of dental caries as prescribed by members of the dental and medical professions according to the needs of individual patients is provided by the ingestion of water and water-containing beverages treated with the tablets of the invention.

In view of the above, it will be seen that the several objects of the invention are achieved and other advantageous results attained.

As various changes could be made in the above products without departing from the scope of the invention, it is intended that all matter contained in the above description shall be interpreted as illustrative and not in a limiting sense.

We claim:

1. A composition in dosage tablet unit form consisting essentially of a compound selected from the group consisting of potassium fluoride, potassium acid fluoride, sodium fluoride, sodium bifluoride, sodium silicofluoride and calcium fluoride, which is soluble in water to form between approximately 0.1 and approximately 4.5 mg. of fluoride ions, a dispersant which is adapted when exposed to water to swell and increase its bulk by a large percent and cause disintegration and dispersion of said tablet, and a major portion of sodium chloride, said tablets having the property of inducing emesis upon the ingestion of a substantial overdosage of tablets, thereby preventing the assimilation of a toxic dose of fluoride ions.

2. A composition in dosage tablet unit form consisting essentially of a compound selected from the group consisting of potassium fluoride, potassium acid fluoride, sodium fluoride, sodium bifluoride, sodium silicofluoride and calcium fluoride, which is soluble in water to form between approximately 0.1 and approximately 4.5 mg. of fluoride ions, a dispersant selected from the group consisting of potato starch and corn starch, a phosphate selected from the group consisting of monocalcium phosphate, dicalcium phosphate and tricalcium phosphate, and a major portion of sodium chloride, said dispersant constituting approximately 0.5% by weight of the composition, said phosphate of calcium constituting between approximately 0.5 and approximately 1.5% by weight of the composition, said tablets having the property of inducing emesis upon the ingestion of a substantial overdosage of tablets, thereby preventing the assimilation of a toxic dose of fluoride ions.

3. 1.5-grain tablets each consisting essentially of approximately 2.2 mg. of sodium fluoride, 0.45 mg. of potato starch, approximately 1.35 mg. of tricalcium phosphate and the balance sodium chloride, said tablets having the property of inducing emesis upon the ingestion of a substantial overdosage of tablets, thereby preventing the assimilation of a toxic dose of fluoride ions.

References Cited in the file of this patent

UNITED STATES PATENTS

| 1,813,936 | Kober | July 14, 1931 |
| 1,943,856 | Cross | Jan. 16, 1934 |
| 2,449,184 | Strean | Sept. 14, 1948 |
| 2,627,493 | Merckel et al. | Feb. 3, 1953 |

FOREIGN PATENTS

| 572,352 | Great Britain | Oct. 3, 1945 |

OTHER REFERENCES

Jour. of Am. Pharm. Assn., Pract. Pharmacy Ed., vol. 11, April 1950, p. 240.

U.S. Disp. 25th ed., J. B. Lippincott Co., Phila., 1955, pp. 1267 and 1274 relied upon.

Tablet Making, Little et al., 1949, Liverpool, Eng., pp. 33 and 92.